US008265423B2

(12) United States Patent
Fukuda

(10) Patent No.: US 8,265,423 B2
(45) Date of Patent: Sep. 11, 2012

(54) IMAGE PROCESSING FOR ARRANGING IMAGES BASED ON SIZE RATIO

(75) Inventor: Yasuo Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 12/277,529

(22) Filed: Nov. 25, 2008

(65) Prior Publication Data

US 2009/0142003 A1 Jun. 4, 2009

(30) Foreign Application Priority Data

Nov. 30, 2007 (JP) ................................. 2007-311481

(51) Int. Cl.
*G06K 9/20* (2006.01)
*H04N 1/46* (2006.01)

(52) U.S. Cl. ........................................ 382/282; 358/537
(58) Field of Classification Search .................. 382/282; 358/537
See application file for complete search history.

(56) References Cited

U.S. PATENT DOCUMENTS

| 7,272,267 B1* | 9/2007 | Nakajima | 382/294 |
| 7,415,137 B2 | 8/2008 | Chen et al. | |
| 8,055,011 B2* | 11/2011 | Ikeda et al. | 382/100 |
| 2001/0048447 A1* | 12/2001 | Jogo | 345/620 |
| 2002/0040375 A1* | 4/2002 | Simon et al. | 707/517 |
| 2002/0085771 A1* | 7/2002 | Sakuramoto | 382/282 |
| 2004/0131235 A1* | 7/2004 | Chen et al. | 382/115 |
| 2005/0134933 A1* | 6/2005 | Tsue et al. | 358/437 |
| 2005/0219665 A1* | 10/2005 | Mino | 358/537 |
| 2006/0222243 A1* | 10/2006 | Newell et al. | 382/173 |
| 2007/0030520 A1* | 2/2007 | Sugimoto | 358/1.18 |
| 2007/0076979 A1* | 4/2007 | Zhang et al. | 382/282 |
| 2007/0236762 A1* | 10/2007 | Tsuji | 358/537 |

FOREIGN PATENT DOCUMENTS

| JP | 11-144067 A | 5/1999 |
| JP | 2004-199673 A | 7/2004 |
| JP | 2005-346474 A | 12/2005 |

* cited by examiner

*Primary Examiner* — Wenpeng Chen
(74) *Attorney, Agent, or Firm* — Carter, DeLuca, Farrell & Schmidt LLP

(57) ABSTRACT

A plurality of images are input, specific regions are set for each of the inputted plurality of images, a typical size of the specific regions of each of the plurality of images is determined, and the ratio of the typical size to the size of the entire image is calculated as a typical size ratio. A typical size ratio used as a reference is selected from the typical size ratios calculated for the respective images as a reference ratio, and a candidate region upon trimming that image is determined based on the specific regions of each of the plurality of images. A trimming region for each of the plurality of images is determined based on the reference ratio, and the typical size ratio and candidate region of each image, and each of the plurality of images is trimmed according to the trimming region.

12 Claims, 12 Drawing Sheets

IMAGE PROCESSING FOR ARRANGING IMAGES BASED ON SIZE RATIO

BACKGROUND OF THE INVENTION

1. Field of the Invention

The present invention relates to image processing, more specifically, processing upon generation of image data by arranging a plurality of images.

2. Description of the Related Art

Upon creating a photo album by arranging, on pages, pictures obtained by mainly capturing faces of persons, when face images of the respective pictures have various sizes, the pictures need to be scaled up or down or be trimmed to uniform the sizes of the face images, resulting in troublesome operations.

Japanese Patent Laid-Open No. 11-144067 discloses an invention that detects the positions and sizes of predetermined target parts of a plurality of pictures, generates normalized images by making uniform the positions and sizes of the target parts of the pictures based on the detection results, and arranges the normalized images according to a designated layout. This invention may meet the above need. However, in practice, the invention is applicable to only a case in which the way images of subjects are captured and the sizes and positions of face images are constant like pictures for certificates.

SUMMARY OF THE INVENTION

In one aspect, a method of controlling an image processing apparatus, the method includes inputting a plurality of images, setting a specific region on each of the inputted plurality of images, determining a typical size of the specific region of each of the plurality of images; calculating a typical size ratio indicating a ratio of the typical size to a size of the entire image, selecting, as a reference ratio, a typical size ratio used as a reference from the typical size ratios calculated for the respective images, determining, based on the specific region of each of the plurality of images, a candidate region upon trimming that image, determining a trimming region of each of the plurality of images based on the reference ratio, and the typical size ratio and the candidate region of that image, and trimming each of the plurality of images in accordance with the trimming region.

According to the aspect, the sizes of specific regions included in pictures can be made nearly uniform upon generation of image data by arranging a plurality of pictures.

Further features of the present invention will become apparent from the following description of exemplary embodiments with reference to the attached drawings.

DESCRIPTION OF THE EMBODIMENTS

Image processing according to embodiments of the present invention will be described in detail hereinafter with reference to the accompanying drawings.

Figure 1:
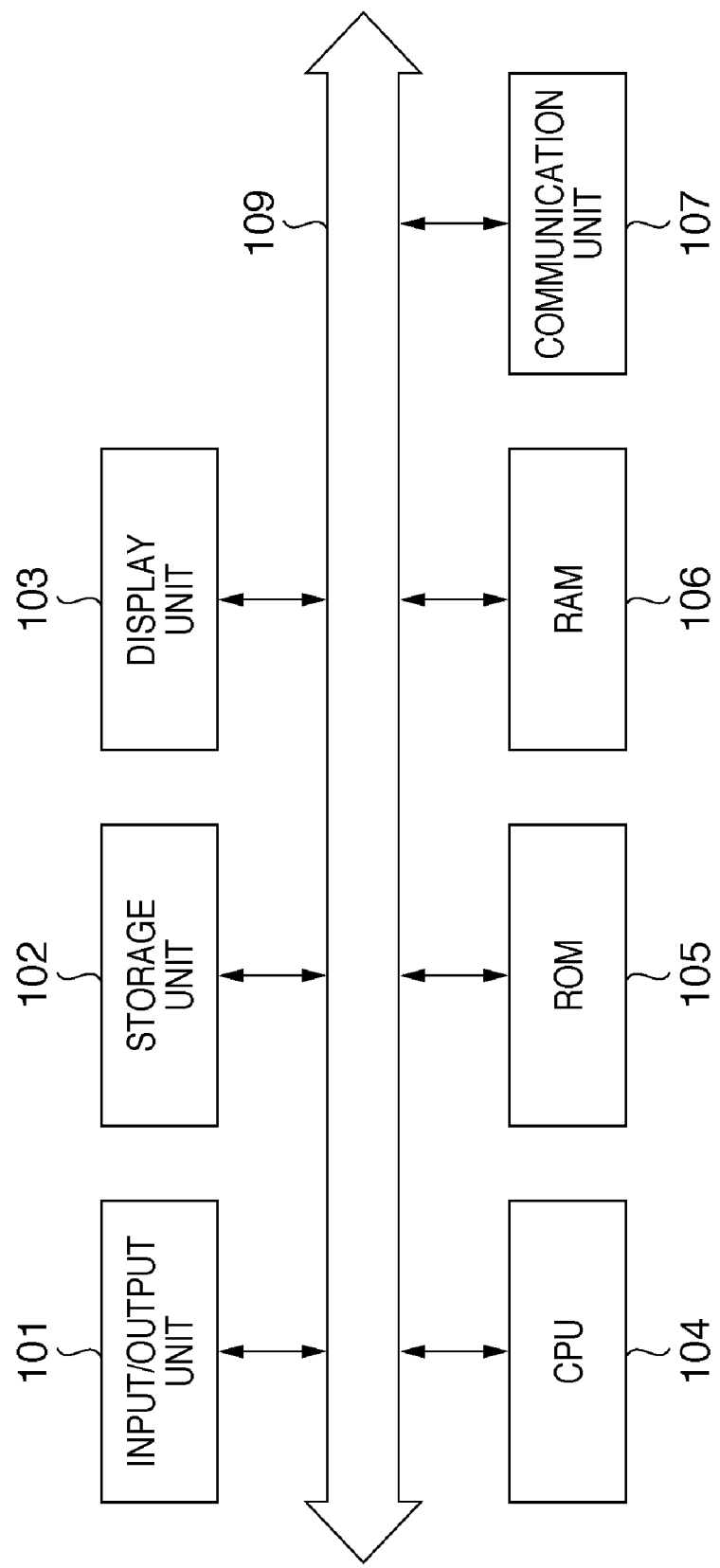
FIG. 1 is a block diagram showing the arrangement of an image processing apparatus according to a first embodiment of the present invention.

FIG. 1 is a block diagram showing the arrangement of an image processing apparatus according to a first embodiment of the present invention.

A microprocessor (CPU) 104 controls components to be described below via a system bus 109 by executing various programs stored in a read-only memory (ROM) 105 and storage unit 102 using a random access memory (RAM) 106 as a work memory. Then, the CPU 104 executes various processes including those to be described later.

An input/output unit 101 comprises a serial bus interface such as USB (Universal Serial Bus), IEEE 1394, or the like, which connects input devices such as a keyboard, mouse, and the like, and image input and output devices such as a memory card reader/writer, digital camera, printer, and the like. Note that a pointing device such as a track ball, track pad, tablet, or the like may be connected to the input/output unit 101 in addition to the mouse. Alternatively, when this embodiment is applied to a device such as a digital camera, printer, or the like, the input/output unit 101 may comprise buttons, a mode dial, and the like. The input/output unit 101 may input characters and commands by operating buttons, a mode dial, and pointing device with respect to a software keyboard.

The CPU 104 inputs a user's instruction from an input device and inputs various data such as image data and the like from a memory card and image input device via the input/output unit 101. Also, the CPU 104 outputs image data of the color processing result to an image output device or memory card via the input/output unit 101.

A display unit 103 comprises, for example, a liquid crystal panel. The CPU 104 displays a graphic user interface (GUI) and the like on the display unit 103. The storage unit 102 comprises, for example, a hard disk drive (HDD), and stores various programs such as an operating system (OS), programs for the processes to be described later, and the like, and various data such as image data and the like. Note that a partial area of the RAM 106 may be allocated on the storage unit 102. Also, a storage unit of a server or the like as a connection destination of a communication unit 107 may be used as the storage unit 102.

The communication unit 107 comprises a network interface card (NIC) used to connect to a network, and makes communications including transmission and reception of various data with a server on the network. Note that the network is not limited to a wired network, and may be a wireless network such as IrDA, IEEE802.11a/b/g/n, Bluetooth, UWB (ultra wide band), and the like.

Figure 2:
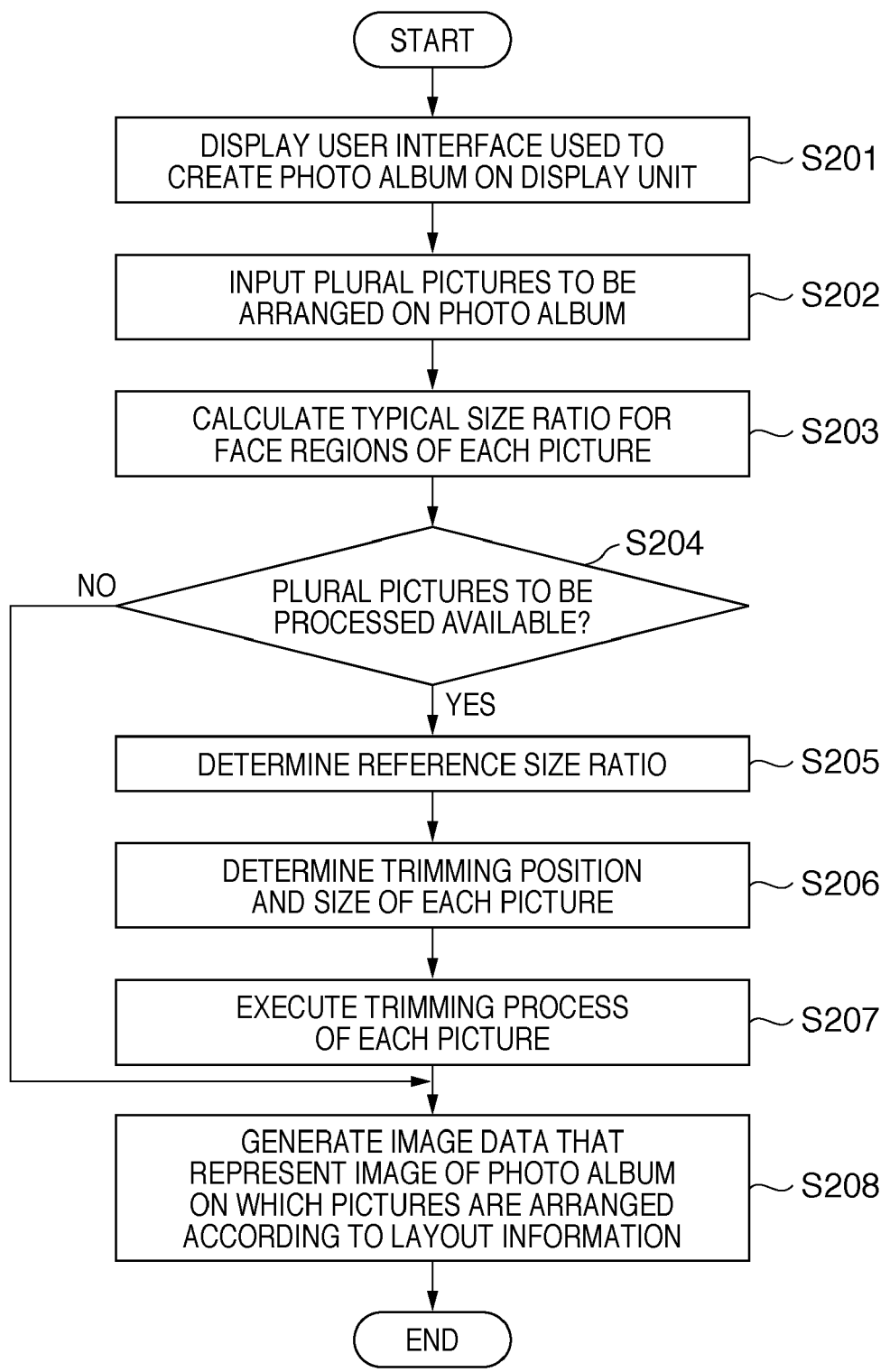
FIG. 2 is a flowchart for explaining image processing according to the first embodiment.

FIG. 2 is a flowchart for explaining image processing according to the first embodiment. The CPU 104 executes this processing.

The CPU 104 displays a user interface (UI) used to create a photo album on the display unit 103, and inputs a user's operation via the input/output unit 101 (S201). Image data are saved in, for example, the storage unit 102, and identifiers such as file names or the like are appended to the respective image data. Therefore, the user selects file names of pictures to be arranged on the photo album from a list view of file names of pictures displayed on the UI. In this case, it is preferable to display thumbnail images of pictures together on the UI.

The user selects pictures to be arranged on the photo album and determines the layout of pictures on the photo album by operating the UI used to create a photo album. That is, the user determines which picture is to be arranged on each page of the photo album, so as to specify pictures to be viewed simultaneously by a viewer of the photo album (e.g., pictures displayed on a certain double-page spread). In response to such user's operations, the CPU 104 generates list information of pictures and layout information, and executes subsequent processes using the list information and image data, and the layout information.

The CPU 104 inputs a plurality of pictures (n pictures) to be arranged on the photo album in accordance with the list information of the pictures selected by the user (S202). That is, the CPU 104 loads image data of the file names described in the list information from the storage unit 102. Of course, the CPU 104 may load image data from a server via the communication unit 107 or from a memory card via the input/output unit 101.

The CPU 104 calculates a typical size ratio for face regions of each picture (S203), as will be described in detail later. Subsequently, the CPU 104 checks if a plurality of pictures to be processed are available (S204). The pictures to be processed are those, the typical size ratio of which is calculated, and the subsequent processes require two or more pictures to be processed. As will be described in detail later, pictures, the typical size ratio of which is calculated, need only be counted, or pictures in which face images are detected in a face-detection process need only be counted.

If the number of pictures to be processed is only one, the CPU 104 jumps the process to generation of an image of the photo album (S208). If two or more pictures to be processed are available, the CPU 104 determines one reference size ratio from the typical size ratios of the respective pictures (S205). The reference size ratio is a reference ratio upon trimming a region including a face image from a picture including a small face image. That is, the CPU 104 sets a maximum one of the typical size ratios of the face regions of the respective pictures as the reference size ratio (reference ratio).

The CPU 104 determines the trimming positions and sizes of the respective pictures (S206), and executes a trimming process of the respective pictures according to the determined trimming positions and sizes (trimming regions) (S207), as will be described in detail later. Note that the CPU 104 does not execute the trimming process of a picture for which the trimming position is not determined, as will be described in detail later.

The CPU 104 generates image data that represents an image of the photo album on which the pictures are arranged according to the layout information, and outputs the generated image data (S208). The output destination of the album image includes the storage unit 102, the display unit 103, a server via the communication unit 107, a memory card or printer via the input/output unit 101, and the like.

Figure 3:
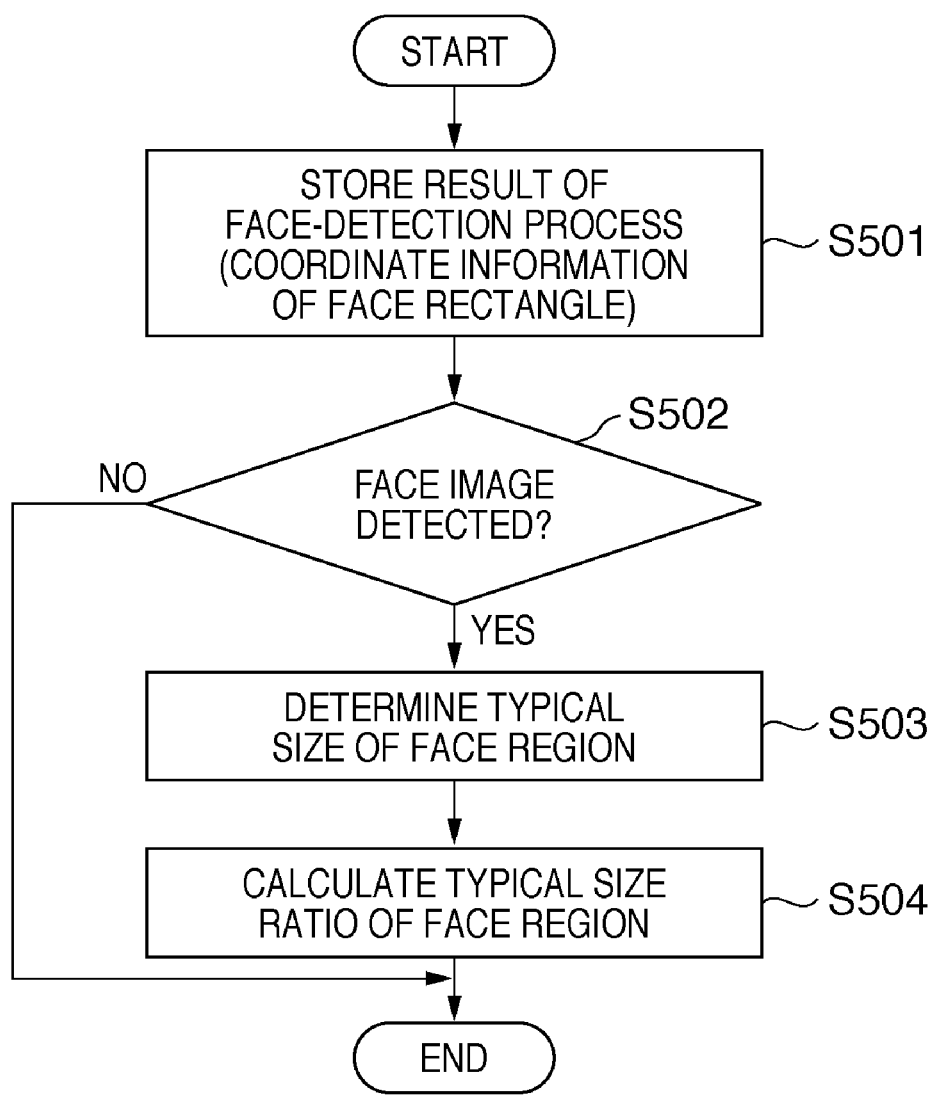
FIG. 3 is a flowchart showing an example of a typical size ratio calculation of face regions of respective pictures according to the first embodiment.

FIG. 3 is a flowchart showing an example of the typical size ratio calculation (S203) of the face regions of each image according to the first embodiment.

In this embodiment, the face regions of subjects are detected from pictures, and the pictures are processed so that the sizes of the face regions (face images) roughly match. Detection of the face regions can use detection methods disclosed in, for example, Japanese Patent Laid-Open No. 2005-346474, Japanese Patent Laid-Open No. 2004-199673, and the like. Each picture may include a plurality of images of persons (face images). In general, the face-detection process returns a plurality of detection results. The face-detection process outputs, for each detected face image, coordinate information indicating the four vertices of a rectangular region (to be referred to as a face rectangle hereinafter) as information that represents a face rectangle indicating an approximate position of a detected face image.

The CPU 104 stores the coordinate information of each face rectangle in the RAM 106 or storage unit 102 (S501). Also, the CPU 104 stores information of a picture that does not include any face image, a picture in which a face image cannot be detected, and the like in the storage unit 102. For example, the CPU 104 records the coordinate information of each face rectangle and the number of detected face images in each record of a table which corresponds to the aforementioned list information and is stored in the RAM 106 or storage unit 102. The CPU 104 records zero as the number of detected face images in a record of a picture that does not include any face image or a picture in which a face image cannot be detected.

The CPU 104 checks if a face image is detected (S502). If no face is detected, the processing ends. If a face image is detected, the CPU 104 determines the typical size of a face region (S503). A picture may include a plurality of face images, which often have different sizes. Hence, the CPU 104 determines one size that represents the sizes of the face images from such picture.

In the following description, an example in which the number of pixels (area) included in a face rectangle is used as the size of a face region will be explained. However, it is easy to determine the typical size of a face region using the height and width of a face rectangle.

The CPU 104 calculates an average value $S_{AVE}$ of the areas of face rectangles as the typical size of the face region. Of course, the CPU 104 may calculate a weighted average. As an example of weighting, weight values according to the positions in a picture are set in advance, and a weight value is determined based on the coordinates of a face rectangle. For example, the weight value of a central part of a picture is set to be larger than those of peripheral parts of the picture, and a larger weight is attached to a face image located at the center of the picture. Alternatively, the reliability of each face rectangle detected by the face-detection process may be used as a weight value.

Alternatively, not all face rectangles need to be used in determination of the typical size of a face region. A picture captured in urban area or the like often includes images of persons (to be referred to as images of non-subject persons hereinafter) other than an image of a person to be captured (to be referred to as an image of a subject person hereinafter). The images of the non-subject persons are normally sufficiently smaller than the image of the subject person. Hence, face rectangles, the area of each of which is less than, for example, ¼ that of a maximum face rectangle, may be excluded from determination of the typical size of a face region. A standard deviation d of the areas of face rectangles may be calculated, face rectangles each having an area less than $S_{AVE}-d$ may be excluded, and the average value $S_{AVE}$ of the areas of the remaining face rectangles may be calculated. Alternatively, when the weight values of peripheral parts of a picture are set to be zero, face rectangles can be excluded depending on the positions of the face rectangles (the positions where face images appear).

The coordinate information of each excluded face rectangle is deleted from the corresponding record of the table which corresponds to the aforementioned list information and is stored in the RAM 106 or storage unit 102, so as not to affect the subsequent processes.

The CPU 104 calculates a ratio between each picture and the typical size of the face regions of that picture (typical size ratio) by:

$$Rs=S_{AVE}/Sw \quad (1)$$

where Rs is the typical size ratio,
$S_{AVE}$ is the typical size, and
Sw is the area of a picture.

The CPU 104 records the typical size ratio in each record of the table which corresponds to the aforementioned list information and is stored in the RAM 106 or storage unit 102 (S504). Note that the CPU 104 records zero as the typical size ratio in a record of a picture that does not include any face image or a picture in which a face image cannot be detected.

Respective pictures often have different image sizes (the numbers of pixels in the vertical and horizontal directions). When these pictures are arranged on a photo album, they are scaled up or down so as to have nearly equal sizes. Therefore, in order to make uniform the sizes of face images, the sizes of face images cannot be made uniform with other pictures unless the ratio of the area with respect to the entire picture (size ratio) is used in place of the area (number of pixels). Hence, the typical sizes of face regions are used.

Figure 4:
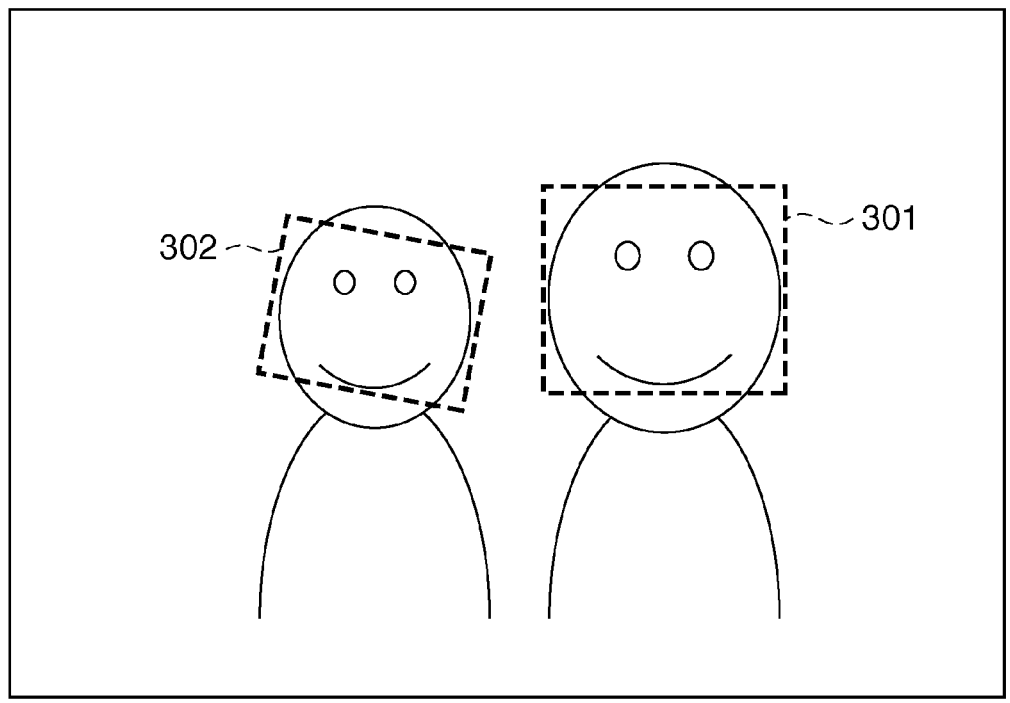
FIGS. 4 and 5 are views showing an example of a picture including face images according to the first embodiment.
Figure 5:
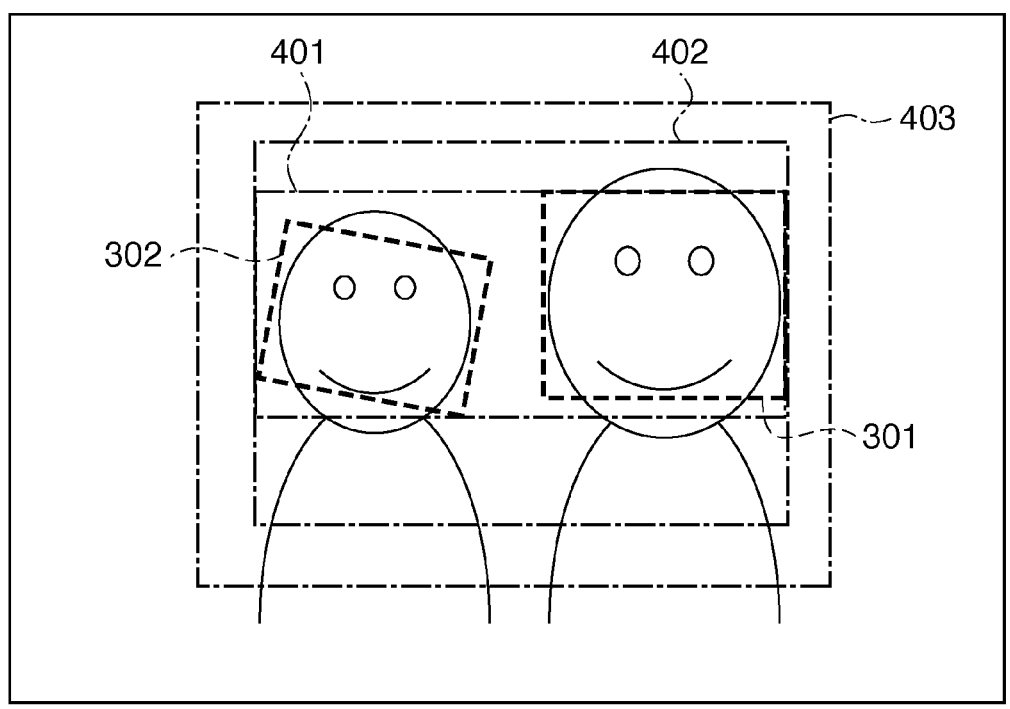

FIGS. 4 and 5 are views showing an example of a picture including face images according to the first embodiment. In FIGS. 4 and 5, face images for two persons are included, and face rectangles 301 and 302 are detected. A method of determining the trimming position and size of this picture will be described below.

Figure 6:
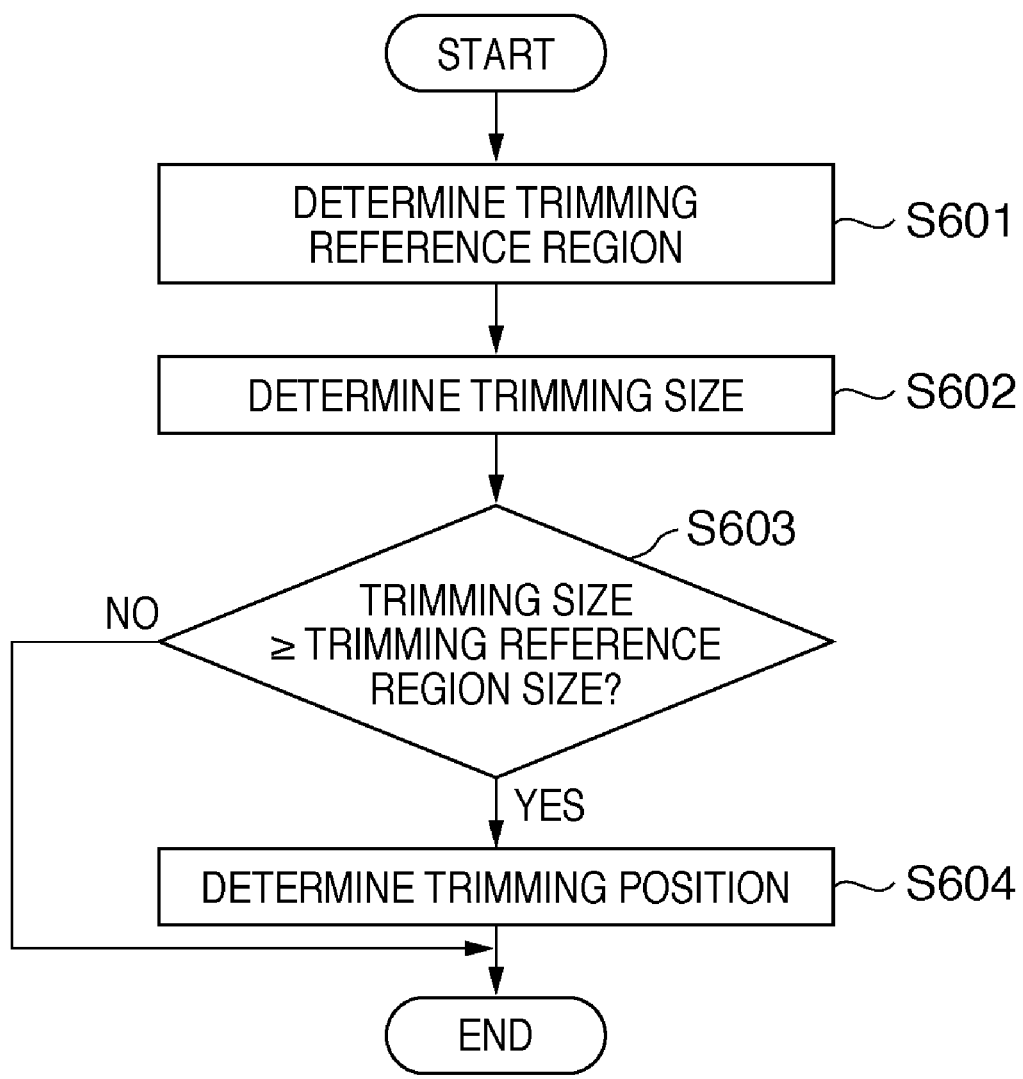
FIG. 6 is a flowchart showing an example of determination of the trimming position and size for one picture according to the first embodiment.

FIG. 6 is a flowchart showing an example of determination of the trimming position and size (S206) for one picture according to the first embodiment. That is, the CPU 104 executes the processing shown in FIG. 6 for each of the pictures to be processed (pictures in which face images are detected).

The CPU 104 determines a trimming reference region as a trimming candidate region (S601). In a picture including images of persons, it is not preferable to cut a face image by trimming. Hence, as shown in FIG. 5, a region 401 including all face images is calculated. For example, maximum values Xmax and Ymax and minimum values Xmin and Ymin of the X- and Y-coordinates of the face rectangles 301 and 302 are calculated, and a rectangle having (Xmin, Ymin) as an upper left vertex and (Xmax, Ymax) as a lower right vertex can be defined as the region 401.

An image after trimming preferably includes not only a face image but also a head part, chest part, and the like. Letting h be the height of the region 401, a region 402 is set by expanding the region 401 by, for example, about h/2 in the upward direction and about h in the downward direction. Furthermore, letting w be the width of the region 401, a region 403 may be set by expanding the region 402 by about w/10 in the right and left directions. An example in which the region 402 is used as a trimming reference region will be explained below. The CPU 104 records the trimming reference region (e.g., the upper left and lower right vertex coordinates) in each record of the table which corresponds to the aforementioned list information and is stored in the RAM 106 or storage unit 102.

The CPU 104 determines a trimming size (S602).

$$Ni'=Ni\times Ri \quad (2)$$

$$\text{for } R_i=Rs_i/R_{REF}$$

where $Rs_i$ is the typical size ratio of the i-th picture (image i) to be processed,
$R_{REF}$ is a reference size ratio (maximum value of typical size ratios Rs),
Ni is the number of pixels (area) of the picture i, and
Ni' is the number of pixels (area) of the picture i after trimming.

According to equation (2), the typical size ratio Rs of the picture i after trimming is the same as that of a picture having the reference size ratio $R_{REF}$ (a picture including a largest face image among those to be processed). Therefore, a magnification Mi of the picture i is given by:

$$Mi=\sqrt{R_i} \quad (3)$$

Therefore, a trimming width Wi' and trimming height Hi' (trimming size) of the picture i are respectively given by:

$$Wi'=Wi\times Mi$$

$$Hi'=Hi\times Mi \quad (4)$$

where Wi is the width of the picture i, and
Hi is the height of the picture i.

The CPU 104 then checks if the trimming size can include the trimming reference region (S603). That is, if the following inequality is met, the trimming size can include the trimming reference region. If the following inequality is not met, since the trimming size cannot include the trimming reference region, the CPU 104 determines that it is impossible to trim the picture i, and ends the processing for the picture i.

$$Wi'\times Hi'\geq(X\max-X\min)\times(Y\max-Y\min) \quad (5)$$

If the above inequality is met, the CPU 104 determines the trimming position (S604). The trimming position need only include the trimming reference region and have the trimming size. However, it is preferable to determine the trimming position so as to attain trimming in consideration of viewing of the picture. Hence, the trimming position is determined so that the center of the trimming reference region, which would be nearly the center of a face image or of a plurality of face images, becomes that of the picture i after trimming. Of course, a method of determining the trimming position so that the centers of the face rectangles 301 and 302 are located at predetermined positions in terms of a field angle may be used. The CPU 104 records the trimming position and size (e.g., the upper left and lower right vertex coordinates) in each record of the table which corresponds to the aforementioned list information and is stored in the RAM 106 or storage unit 102. Note that the CPU 104 can record all zeros (trimming position is not set) as the trimming position for a picture which cannot be trimmed.

As described above, an album image can be generated by trimming pictures, so as to roughly uniform the sizes (an average size if a plurality of face images are included) of face images of pictures including images of persons, of those to be included in a photo album.

In the description of the above example, as a specific region used to determine the trimming position and size, a face image of a person is used. However, a specific region can be set for other subjects (automobile, animal, flower, house, and the like).

Image processing of a second embodiment according to the present invention will be described below. Note that the same reference numerals in the second embodiment denote the same components as in the first embodiment, and a detailed description thereof will not be repeated.

The first embodiment has exemplified the case in which face rectangles (specific regions) are set by the face-detection process, and the trimming position and size are determined. The user may set the specific regions.

Figure 7:
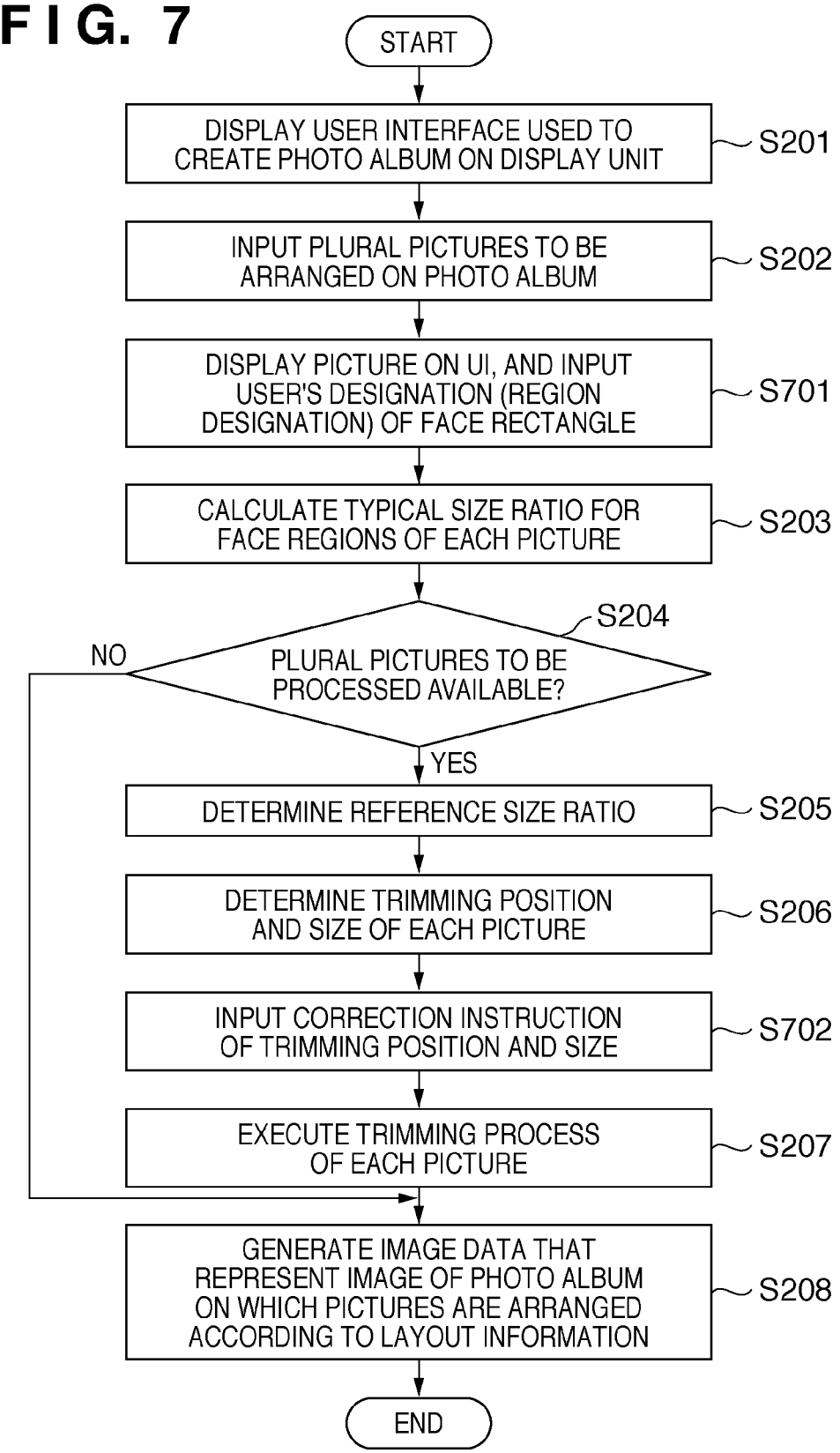
FIG. 7 is a flowchart for explaining image processing according to a second embodiment.

FIG. 7 is a flowchart for explaining image processing of a second embodiment. The CPU 104 executes this processing. Descriptions of steps appearing in the first embodiment and already described in FIG. 2 are omitted for the most part.

After a plurality of pictures are input (S202), the CPU 104 displays the pictures on the UI and then inputs, for example, user's designations (region designations) of the face rectangles 301 and 302 shown in FIG. 4 (S701). The user instructs to skip a picture that does not require any region designation (e.g., no image of a person is included).

After completion of the region designations of all the pictures, the CPU 104 executes steps S203 to S206 as in the first embodiment.

Figure 8:
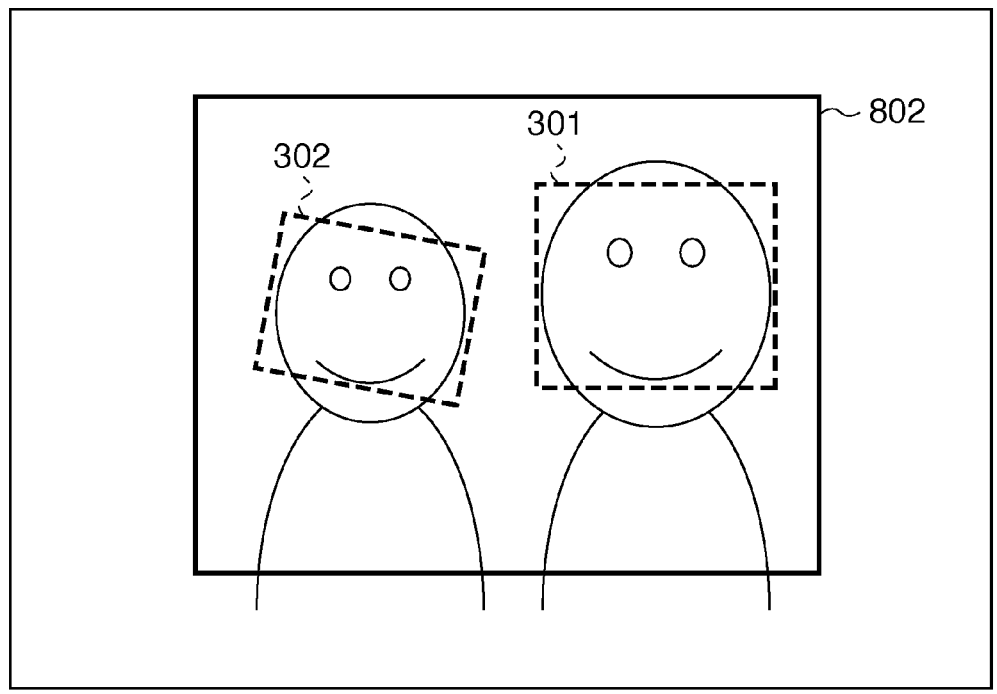
FIG. 8 is a view showing a rectangle indicating a trimming region according to the second embodiment.

The CPU 104 displays an image indicating the trimming position and size determined in step S205 on the display unit 103, and inputs a user's instruction (correction instruction) to correct the trimming position and size (S702). The user gives the instruction for a correction by operating a rectangle indicating the trimming position and size (for example, a rectangle 802 shown in FIG. 8), and gives the instruction to skip a picture that does not require any correction. The CPU 104 corrects the trimming position and size (e.g., the upper left and lower right vertex coordinates) in each record of the table, which corresponds to the aforementioned list information and is stored in the RAM 106 or storage unit 102, in accordance with the correction instruction.

Upon completion of the correction of the trimming positions and sizes of all the pictures, the CPU 104 executes steps S207 and S208 as in the first embodiment.

Image processing of the third embodiment according to the present invention will be described below. Note that the same reference numerals in the third embodiment denote the same components as in the first and second embodiments, and a detailed description thereof will not be repeated.

The first embodiment has explained the example in which trimming is allowed when the trimming size determined based on the reference size ratio can include the trimming reference region. The third embodiment will explain an example in which the trimming size has a width expanded within a predetermined range. A viewer does not view images while measuring the sizes of face images. That is, the sizes of face images included in a plurality of pictures need only be nearly equal to each other after trimming rather than before trimming.

Figure 9:
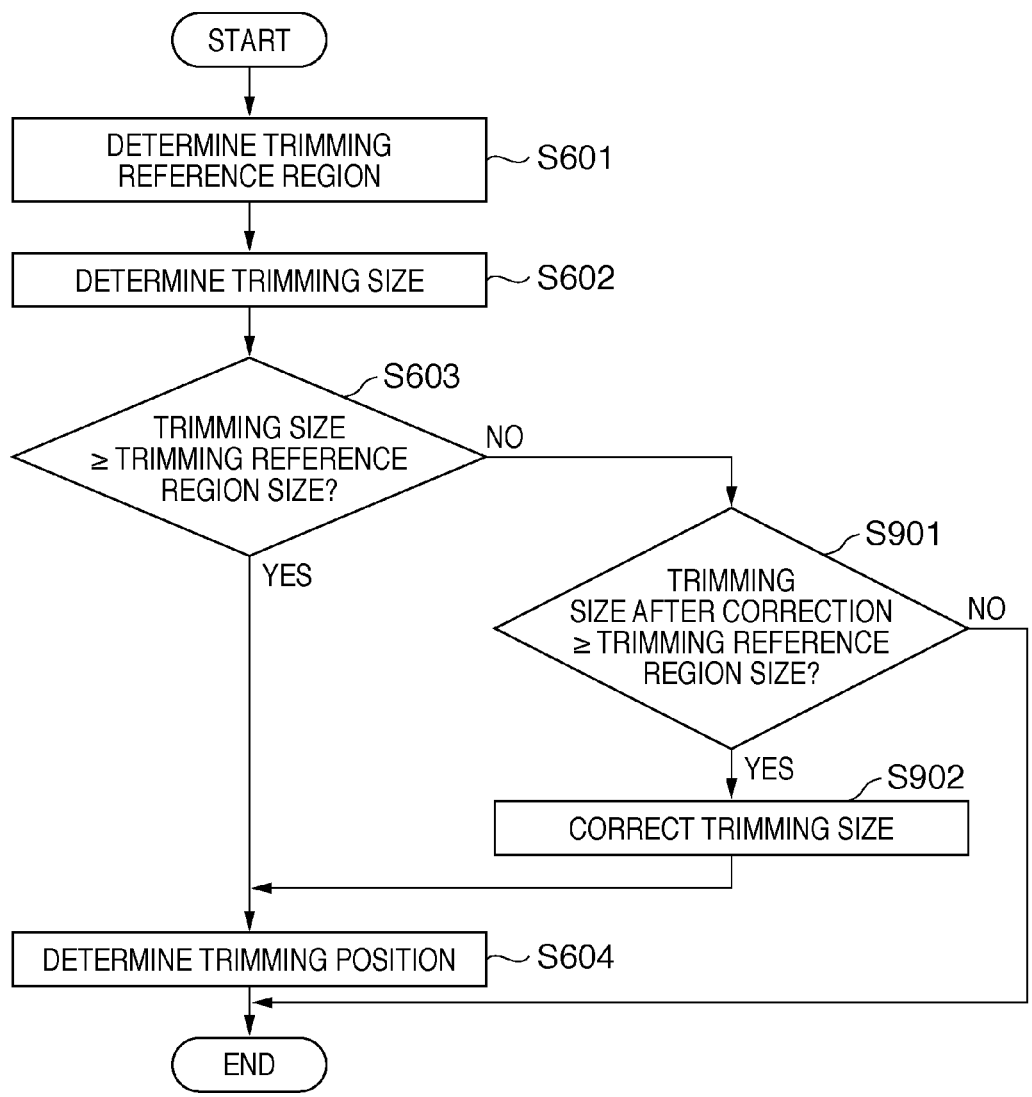
FIG. 9 is a flowchart showing an example of determination of the trimming position and size for one picture according to a third embodiment.

FIG. 9 is a flowchart showing an example of determination of the trimming position and size (S206) for one picture according to a third embodiment. Descriptions of steps appearing in the first embodiment and already described in FIG. 6 are omitted for the most part.

If it is determined in step S603 that it is impossible to trim, the CPU 104 checks if a trimming size obtained by multiplying the height and width of the trimming size by a (>1) can include the trimming reference region (S901).

$$a^2 \times Wi' \times Hi' \leqq (X\max - X\min) \times (Y\max - Y\min) \quad (6)$$

If the above inequality is not met, since the expanded trimming size cannot include the trimming reference region, the CPU 104 determines that it is impossible to trim the picture i, and ends the processing for the picture i. If the above inequality is met, the CPU 104 corrects the trimming size (S902), and the process advances to step S604.

The trimming size after correction may be defined by $a \times Wi'$ and $a \times Hi'$. However, it is preferable to calculate a minimum expansion coefficient b ($1 \leqq b < a$) that allows including the trimming reference region, and to define the trimming size after correction by $b \times Wi'$ and $b \times Hi'$.

In the description of the above example, the trimming size calculated based on $Rs_i/R_{REF}$ (a ratio between the typical size ratio and reference size ratio) is multiplied by the predetermined expansion coefficient a to expand the width of the trimming size. However, the above ratio may be multiplied by an expansion coefficient designated by the user to assure a margin for the trimming size.

Image processing of a fourth embodiment according to the present invention will be described below. Note that the same reference numerals in the fourth embodiment denote the same components as in the first to third embodiments, and a detailed description thereof will not be repeated.

The image processing of each of the above embodiments can be applied to, for example, an application used to create a photo album. An example in which the above image processing is applied to creation of a photo album will be described below.

Figure 10:
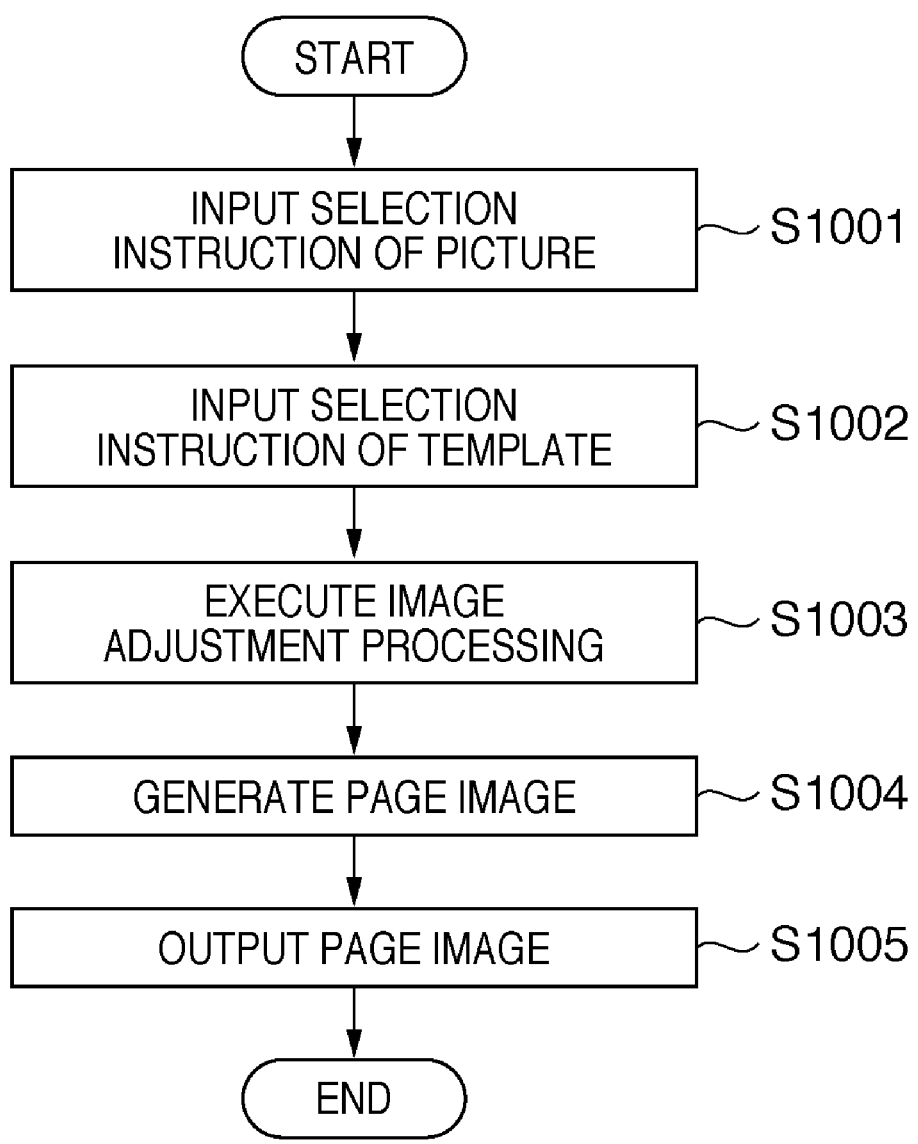
FIG. 10 is a flowchart for explaining creation of a photo album according to a fourth embodiment.

FIG. 10 is a flowchart for explaining creation of a photo album according to a fourth embodiment.

The CPU 104 displays a UI on the display unit 103 and inputs user's instructions of pictures to be used in a photo album (S1001).

Figure 11:
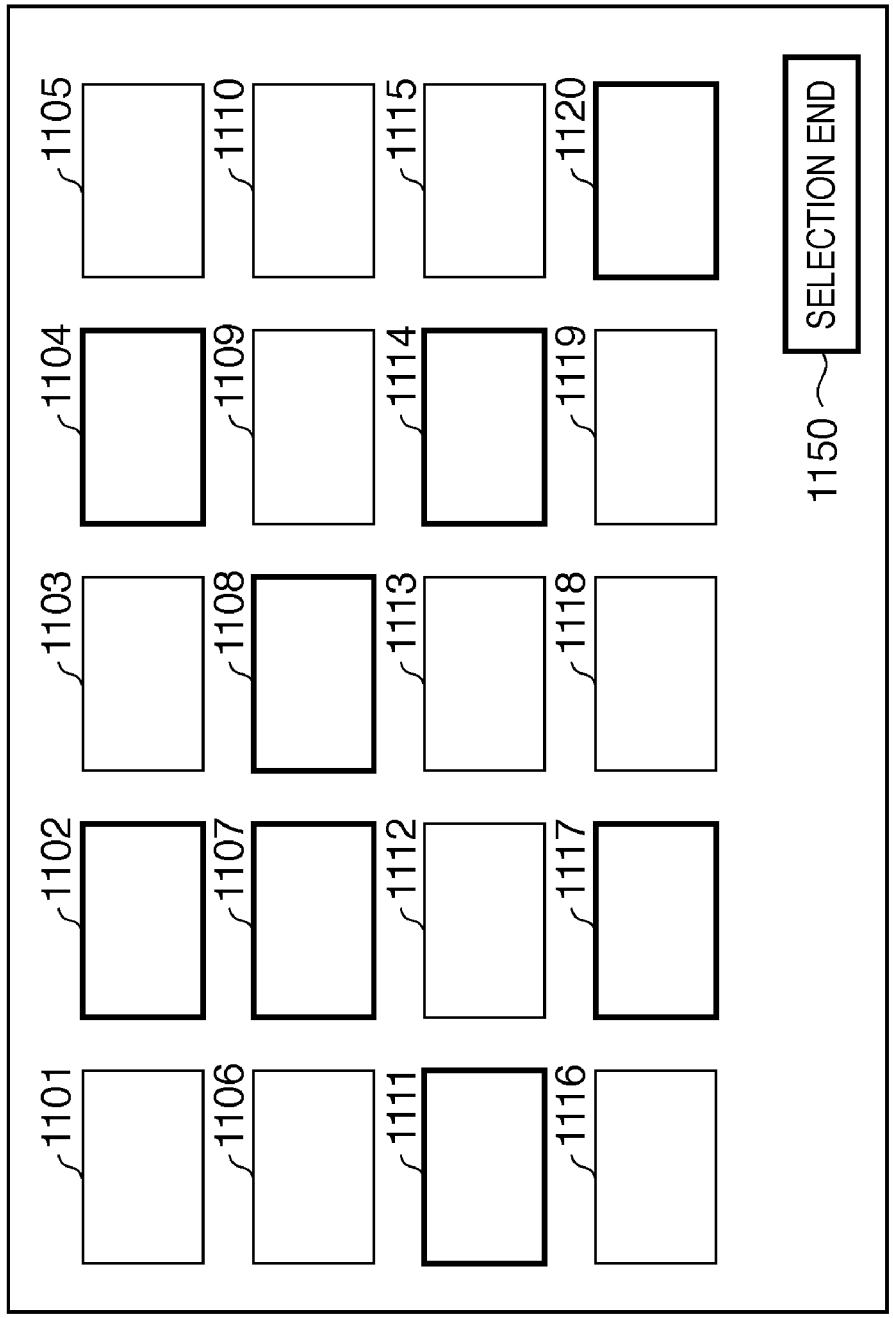
FIG. 11 is a view showing an example of an image selection UI according to the fourth embodiment.

FIG. 11 is a view showing an example of a picture selection UI according to the fourth embodiment. The UI shown in FIG. 11 displays a list of thumbnail images 1101 to 1120 of a plurality of pictures stored in, for example, a predetermined area of the storage unit 102. The user selects pictures used in a photo album from these thumbnail images. In the example shown in FIG. 11, the user selects eight pictures 1102, 1104, 1107, 1108, 1111, 1114, 1117, and 1120, indicated by bold frames.

Upon completion of selection of the pictures, the user presses a selection end button 1150. Upon pressing of the button 1150, the CPU 104 examines the selection and non-selection states of the respective pictures, and generates list information that represents the pictures in the selection state. The list information records the selection order of pictures, and the subsequent processes are executed in the selection order. Alternatively, the subsequent processes may be executed in the order of names of data files of the pictures or in the order of photographing dates and times recorded in Exif information appended to image data.

The CPU 104 displays templates of photo albums having different layouts on the UI, and inputs a user's instruction (selection instruction) of a template used for a photo album (S1002).

Figure 12:
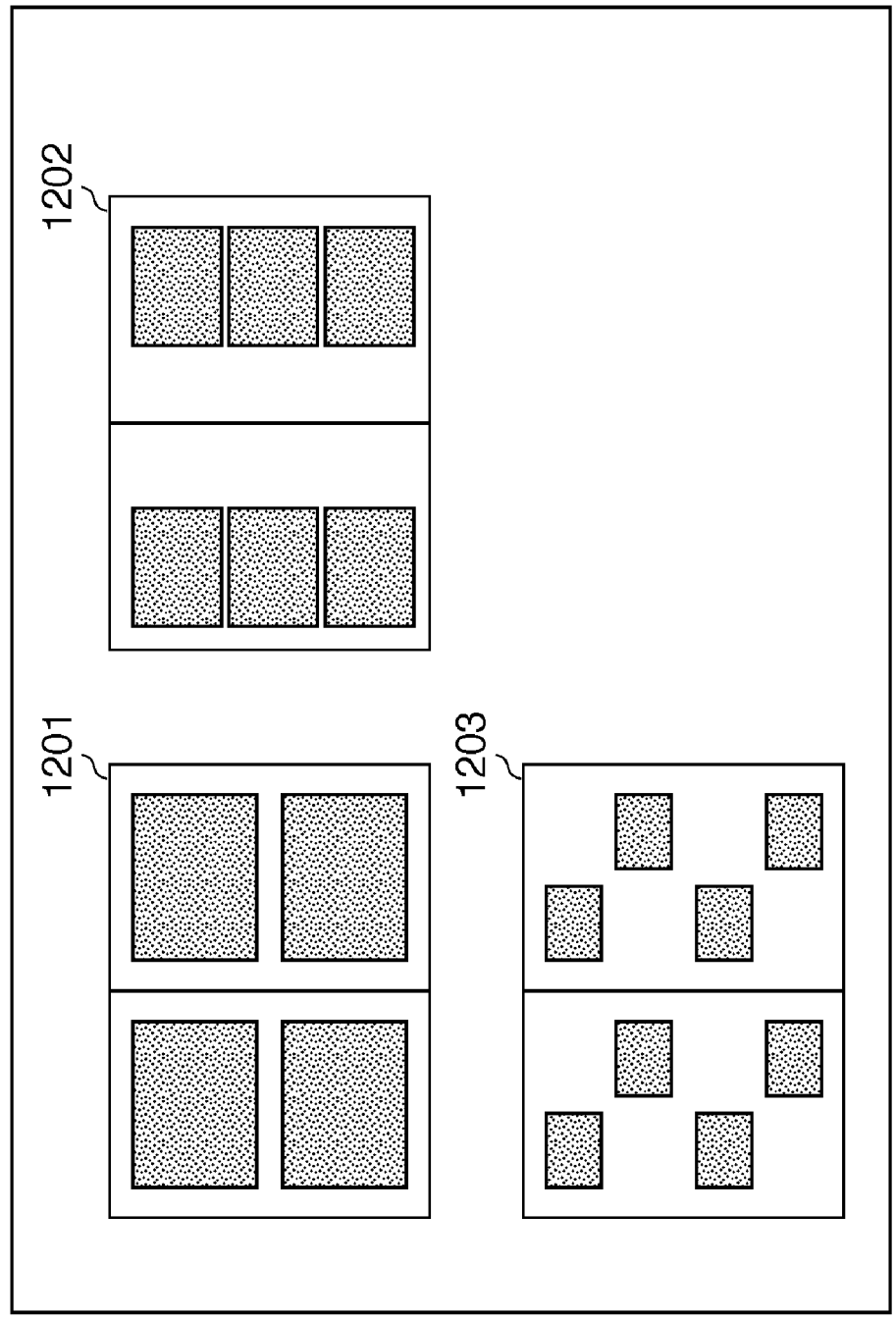
FIG. 12 is a view showing an example of a template selection UI according to the fourth embodiment.

FIG. 12 is a view showing an example of a template selection UI according to the fourth embodiment. The UI shown in FIG. 12 displays a plurality of templates 1201 to 1203 stored in, for example, a predetermined area of the storage unit 102. The user selects a template used for a photo album from these templates.

The CPU 104 then executes an image adjustment process (S1003). The image adjustment process includes, for example, normal trimming, retouch, replacement of the arrangement order of pictures, and the like.

Figure 13:
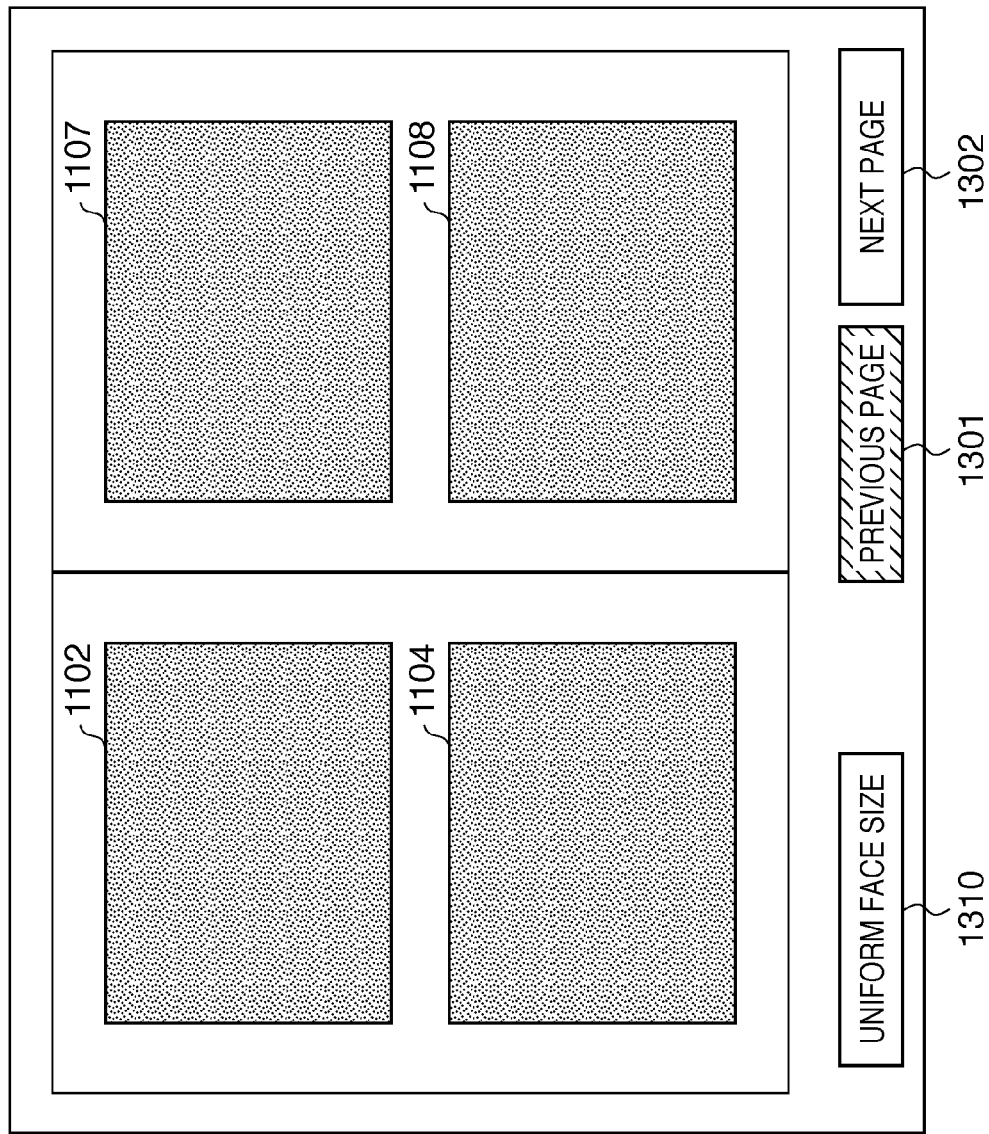
FIG. 13 is a view showing an example of a UI upon selection of a template used to arrange two pictures per page according to the fourth embodiment.

FIG. 13 is a view showing an example of a UI upon selection of a template (the template 1201 shown in FIG. 12) used to arrange two pictures per page according to the fourth embodiment. In the following description, assume that the arrangement order of pictures is ascending order of reference numeral on the UI shown in FIG. 11. Therefore, in FIG. 13, the pictures 1102, 1104, 1107, and 1108 are displayed on the first and second pages of an album.

The user can select the next or previous page of an album by pressing a button 1301 or 1302. In this case, when the first and second pages are displayed on the UI, as shown in FIG. 13, the button 1301 is invalid since the user cannot select the previous page. The user can change the arrangement of pictures by dragging and dropping pictures on the UI shown in FIG. 13. Also, the user can give the instruction to retouch a picture from a menu or the like (not shown).

A button 1310 is pressed by the user when he or she gives the instruction to execute an image process for uniforming the sizes of face images. Upon pressing of the button 1310, the CPU 104 executes a process associated with trimming in the image processing of each of the above embodiments. After the user retouches the pictures and adjusts the arrangement order, he or she presses the button 1310 to give the instruction to execute the process for uniforming the sizes of face images.

Pictures which are to undergo the process for uniforming the sizes of face images need not be all the pictures selected in step S1001, but may be those included in a double-page spread (one page depending on a template). In the example shown in FIG. 13, the CPU 104 executes the process for uniforming the sizes of face images for the four pictures 1102, 1104, 1107, and 1108 as a unit.

The CPU 104 generates image data for each page (generate a page image) in correspondence with the layout of the selected template (S1004). In this case, pictures including images of persons have been trimmed via the image processing (the process for uniforming the sizes of face images) described in each of the above embodiments. Note that according to the processing described in each of the above embodiments, the process for making uniform the ratio of the size of a face rectangle to the entire picture is executed. Therefore, when pictures are arranged (including scaling up or down) on the template which is exemplified in FIGS. 12 and 13, and is used to arrange pictures to have an identical size, face images of the respective pictures after arrangement have nearly uniform sizes.

The CPU 104 outputs the generated image data (page image) for each page (S1005). The output destination of image data includes the storage unit 102, the display unit 103, a server via the communication unit 107, a memory card or printer via the input/output unit 101, and the like, as described above. When image data is output to the storage unit 102 or server, data to be output for each page need not always have an image data format. For example, data to be output may have a layout description format such as HTML (hypertext markup language), SVG (scalable vector graphics), or the like. In this case, the saving location of image data after trimming (the process for uniforming the sizes of face images) is not particularly limited as long as these data can be designated and referred to by the data in the layout description format.

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-311481, filed Nov. 30, 2007, which is hereby incorporated by reference herein in its entirety.

What is claimed is:

1. An image processing apparatus comprising:
   an input unit configured to input a plurality of images;
   a setting unit configured to set a specific region on each of the plurality of images;
   a calculation unit configured to determine a typical size of the specific region of each of the plurality of images and to calculate a typical size ratio for each of the plurality of images, the typical size ratio indicating a ratio of the typical size to a size of the entire image of each of the plurality of images;
   a selection unit configured to select a typical size ratio to be used as a reference ratio from the typical size ratios calculated for the plurality of images;
   a first determination unit configured to determine a candidate region for each of the plurality of images based on the specific region of the respective image;
   a second determination unit configured to determine a trimming region of each of the plurality of images based on the reference ratio, the typical size ratio, and the candidate region of the respective image; and
   a trimming unit configured to trim each of the plurality of images in accordance with the trimming region of the respective image.

2. The apparatus according to claim 1, wherein the setting unit sets a subject included in each of the plurality of images as the specific region.

3. The apparatus according to claim 1, wherein the setting unit sets the specific region according to a user's designation.

4. The apparatus according to claim 1, wherein the selection unit selects a maximum typical size ratio from the typical size ratios of the plurality of images as the reference ratio.

5. The apparatus according to claim 1, wherein the calculation unit determines an average value of areas of the specific regions of each of the plurality of images as the typical size.

6. The apparatus according to claim 1, wherein the calculation unit excludes specific regions having areas smaller than other areas of the specific regions of each of the plurality of images from determination of the typical size.

7. The apparatus according to claim 1, wherein the first determination unit determines a rectangular region including all the specific regions of each of the plurality of images as the candidate region.

8. The apparatus according to claim 1, wherein the second determination unit determines a size of the trimming region in accordance with a ratio between the reference ratio and the typical size ratio, and determines the trimming region to include the candidate region.

9. The apparatus according to claim 1, wherein the second determination unit adjusts a size of the trimming region within a predetermined range when the size of the candidate region is larger than the size of the trimming region.

10. The apparatus according to claim 1, further comprising a generator configured to generate image data by arranging the plurality of images after the trimming unit trims the plurality of images.

11. A method of controlling an image processing apparatus, the method comprising:
   inputting a plurality of images;
   setting a specific region on each of the plurality of images;
   determining a typical size of the specific region of each of the plurality of images;
   calculating a typical size ratio of each of the plurality of images, the typical size ratio indicating a ratio of the typical size to a size of the entire image of each of the plurality of images;
   selecting a typical size ratio to be used as a reference ratio from the typical size ratios calculated for the plurality of images;
   determining a candidate region for each of the plurality of images based on the specific region of the respective image;
   determining a trimming region of each of the plurality of images based on the reference ratio, the typical size ratio, and the candidate region of the respective image; and
   trimming each of the plurality of images in accordance with the trimming region of the respective image.

12. A non-transitory computer-readable storage medium storing a computer-executable program for causing a computer to perform a method of controlling an image processing apparatus, the method comprising:
   inputting a plurality of images;
   setting a specific region on each of the plurality of images;
   determining a typical size of the specific region of each of the plurality of images;
   calculating a typical size ratio of each of the plurality of images, the typical size ratio indicating a ratio of the typical size to a size of the entire image of each of the plurality of images;
   selecting a typical size ratio to be used as a reference ratio from the typical size ratios calculated for the plurality of images;
   determining a candidate region for each of the plurality of images based on the specific region of the respective image;
   determining a trimming region of each of the plurality of images based on the reference ratio, the typical size ratio, and the candidate region of the respective image; and
   trimming each of the plurality of images in accordance with the trimming region of the respective image.

* * * * *